US010331132B2

(12) United States Patent
Meeker et al.

(10) Patent No.: US 10,331,132 B2
(45) Date of Patent: Jun. 25, 2019

(54) REMOTELY CONTROLLED ROBOT

(71) Applicant: Foster-Miller, Inc., Waltham, MA (US)

(72) Inventors: David C. Meeker, Natick, MA (US); Timothy J. Mason, Uxbridge, MA (US); Richard Wiesman, Wayland, MA (US)

(73) Assignee: Foster-Miller, Inc., Waltham, MA (US)

( * ) Notice: Subject to any disclaimer, the term of this patent is extended or adjusted under 35 U.S.C. 154(b) by 207 days.

(21) Appl. No.: 15/618,261

(22) Filed: Jun. 9, 2017

(65) Prior Publication Data

US 2018/0024556 A1 Jan. 25, 2018

Related U.S. Application Data

(60) Provisional application No. 62/366,268, filed on Jul. 25, 2016.

(51) Int. Cl.
| | |
|---|---|
| *G05D 1/00* | (2006.01) |
| *B64D 47/08* | (2006.01) |
| *B60F 5/02* | (2006.01) |
| *B64C 39/02* | (2006.01) |
| *B64C 37/00* | (2006.01) |
| *G05D 1/02* | (2006.01) |

(52) U.S. Cl.
CPC ............. *G05D 1/0088* (2013.01); *B60F 5/02* (2013.01); *B64C 37/00* (2013.01); *B64C 39/024* (2013.01); *B64D 47/08* (2013.01); *G05D 1/0011* (2013.01); *G05D 1/0022* (2013.01); *G05D 1/0242* (2013.01); *G05D 1/0251* (2013.01); *B64C 2201/027* (2013.01); *B64C 2201/126* (2013.01); *B64C 2201/127* (2013.01); *B64C 2201/128* (2013.01); *B64C 2201/146* (2013.01)

(58) Field of Classification Search
CPC .. G05D 1/0088; G05D 1/0242; G05D 1/0022; G05D 1/0251; G05D 1/0011; B60F 5/02; B64C 39/024; B64C 37/00; B64C 2201/027; B64C 2201/128; B64C 2201/127; B64C 2201/126; B64C 2201/146; B64D 47/08
See application file for complete search history.

(56) References Cited

U.S. PATENT DOCUMENTS

| | | | |
|---|---|---|---|
| 5,746,390 A | 5/1998 | Chippetta | |
| 6,263,989 B1 | 7/2001 | Won | |
| 6,457,670 B1 | 10/2002 | Geranio et al. | |
| 7,926,598 B2 | 4/2011 | Rudakevych | |
| 8,201,649 B2 | 6/2012 | Andrus et al. | |
| 8,602,134 B2 | 12/2013 | Andrus et al. | |
| 9,205,922 B1 * | 12/2015 | Bouwer | B64D 9/00 |

(Continued)

*Primary Examiner* — Frederick M Brushaber
(74) *Attorney, Agent, or Firm* — Iandiorio Teska & Coleman, LLP

(57) ABSTRACT

A battery powered remotely controlled robot is equipped with a drive subsystem for ground travel, a flight subsystem for flight operations, and an obstacle detection subsystem. The robot is configured so that during a mission the drive subsystem is energized to maneuver the robot on the ground for a majority of the mission. The robot is further configured so that upon detection of an obstacle, the flight subsystem is energized to traverse the obstacle. The fight subsystem is energized only to traverse obstacles thus saving battery power and increasing the mission time.

36 Claims, 9 Drawing Sheets

(56) References Cited

U.S. PATENT DOCUMENTS

| | | | |
|---|---|---|---|
| 9,262,929 B1* | 2/2016 | Roy | G08G 5/0034 |
| 9,364,766 B2 | 6/2016 | Mielniczek | |
| 9,506,783 B2* | 11/2016 | Fukuba | G01D 18/004 |
| 2007/0045012 A1 | 3/2007 | Brehob et al. | |
| 2013/0176423 A1 | 7/2013 | Rischmuller et al. | |
| 2014/0061362 A1 | 3/2014 | Olm et al. | |
| 2014/0131507 A1 | 5/2014 | Kalantari et al. | |
| 2016/0114887 A1* | 4/2016 | Zhou | B60F 5/02 348/148 |
| 2016/0286128 A1* | 9/2016 | Zhou | H04N 5/23248 |
| 2017/0067668 A1* | 3/2017 | Fukuba | G01D 18/004 |
| 2017/0072755 A1* | 3/2017 | Zhou | B64C 29/0075 |
| 2017/0361942 A1* | 12/2017 | Jalaldeen | B64D 31/06 |

* cited by examiner

REMOTELY CONTROLLED ROBOT

RELATED APPLICATIONS

This application claims benefit of and priority to U.S. Provisional Application Ser. No. 62/366,268 filed Jul. 25, 2016 under 35 U.S.C. §§ 119, 120, 363, 365, and 37 C.F.R. § 1.55 and § 1.78 and which is incorporated herein by this reference.

FIELD OF THE INVENTION

This subject invention relates to remotely controlled robots.

BACKGROUND OF THE INVENTION

Some ground robots exist that address an indoor surveillance mission. Specifically, Endeavor Robotics markets the 110 FirstLook as a small portable reconnaissance robot. See U.S. Pat. No. 7,926,598 incorporated herein by this reference. The robot incorporates a rear flipper that aids in stair climbing and obstacle traversal. However, the robot is small enough that it is easily stymied by large obstacles.

Larger robots readily climb stairs and traverse obstacles, but these robots are much larger (large enough to span several stairs). See U.S. Pat. Nos. 6,263,989; 8,201,649; and 8,602,134 incorporated herein by this reference. But, they may not be suitable for dismounted transport in a backpack, or operation within a confined environment that could include indoor situations, inside ships and aircraft, or inside manufacturing plants with closely spaced machinery.

As an alternative to ground robots, an exclusively aerial solution could be considered. A wide number of "quad-rotor" or multi-rotor drones are presently commercially available. However, these drones have several shortcomings for an indoor surveillance application. For example, quad-rotor drones often rely on GPS for knowledge of their position. GPS is typically not available indoors. It also is difficult to maneuver quad-rotors indoors without colliding with indoor obstacles, walls, and ceilings. Finally, a typical quad-rotor flight time is short, about 15 minutes.

Some drones have been designed with protection so that the can safely collide with indoor obstacles. Such a design is described in U.S. 2014/0131507 incorporated herein by this reference. However, the additional cage structure only exacerbates problems with short persistence by adding additional flying weight.

Hybrid vehicles that combine a quad-rotor with a wheeled or tracked vehicle also exist. Some examples are described at http://www.bgobeyond.co.uk. These vehicles can leverage their flight capability to surmount obstacles, yet can also function as ground robots. However, the large rotors required for lift span nearly the entire surface of the robot and the payload weight (and total weight, for that matter) seems low. See also U.S. Pat. No. 9,364,766 incorporated herein by this reference.

BRIEF SUMMARY OF THE INVENTION

First Responders (Fire/Rescue, Police) and Military may use the small but agile robot of the invention for indoor surveillance or operation within any confined environment through which a purely ground traversing robot might encounter obstacles which cannot be overcome. This robot would be used to quickly assess a situation or clear a building by moving throughout the building and looking for occupants or hazards.

The preferred robot may be relatively lightweight and portable (entire system <25 lbs). The robot is fast to set up when personnel arrive at an incident. The robot can easily and quickly traverse everyday obstacles like stairs, carry a significant sensor payload, and/or is able to persist on-scene for a long time (several hours) on battery power. The vehicle is also able to carry a significant payload (e.g., 1-2 kilograms) and is easy to operate.

Featured is a method comprising equipping a battery powered remotely controlled robot with a drive subsystem for ground travel, a flight subsystem for flight operations, and an obstacle detection subsystem. The robot is configured that during a mission, the drive subsystem is energized to maneuver the robot on the ground for a majority of the mission. Upon detection of an obstacle, the flight subsystem is energized to traverse the obstacle. The fight subsystem is energized only to traverse obstacles saving energy (e.g., battery power) and thus increasing the mission time.

Preferably, detection of an obstacle, the fight subsystem is automatically energized. Also, flight operations may be locked out if no obstacle is detected. In some examples, an operator may be allowed to override the lockout.

In some examples, the flight subsystem includes ducted fans housed in a robot body and the drive subsystem includes one or more motorized wheels, for example, right and left motorized wheels and a front non-motorized castering wheel. Further included may be a payload associated with the robot. Mounts on the robot body may be used for the payload.

In one version, the obstacle detection subsystem includes a forward looking camera mounted to the robot body, e.g., a stereo camera. Further included may be an infrared camera and/or a LIDAR subsystem. The robot may further include a downward looking optical flow meter mounted underneath the robot body.

The robot body may be configured to fit in a Molle assault pack. In one example, the robot body is less than about 20 inches wide by about 20 inches long and less than about 6 inches tall. The robot preferably weighs less than about 25 pounds.

Further included may be a communications subsystem for remotely controlling the robot. One communications subsystem includes a Wi-Fi subsystem and a cellular subsystem. A cell antenna and a Wi-Fi antenna may be located upstanding the robot body.

Also featured is a remotely controlled robot comprising robot body, a drive subsystem for ground travel of the robot body, a flight subsystem for flight operations of the robot body including, in one example, a plurality of fixed ducted fans housed in the robot body, an obstacle detection subsystem, and a battery subsystem for powering the drive subsystem and the ducted fans. A controller subsystem is responsive to the obstacle detection subsystem and configured to upon detection of an obstacle, energize the flight subsystem to traverse the obstacle, and, in the absence of a detected obstacle, to energize the drive subsystem for ground travel of the robot body to increase mission time.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
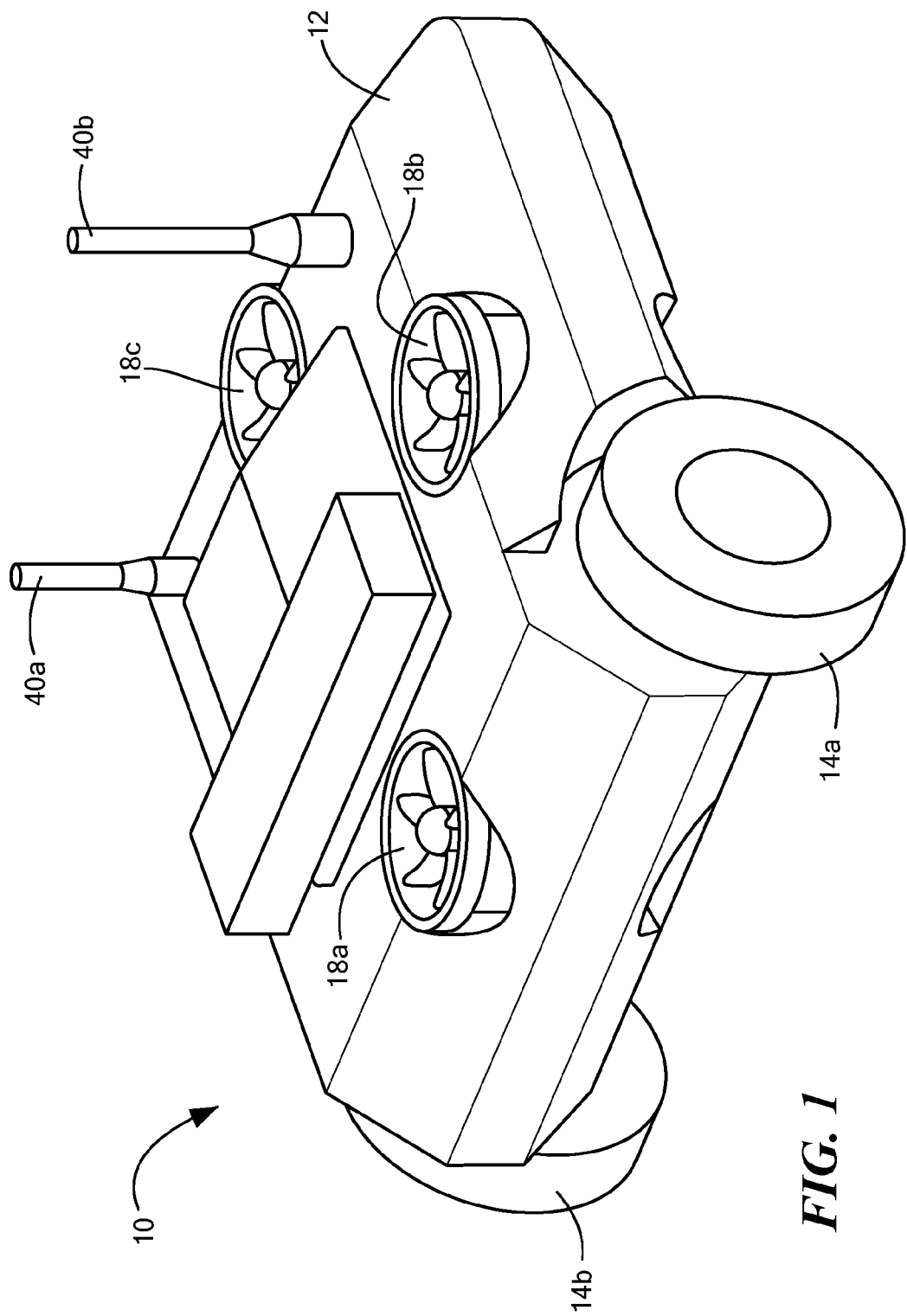
FIG. 1 is a schematic view of an example of a robot in accordance with the invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

In one example, the robot is a ground robot that achieves flight capability by incorporating a number of small ducted fan engines. The ducted fan engines allow a large thrust to be created in a physically small package. The robot can traverse obstacles via short, controlled flights. However, since the robot is also wheeled or tracked, the robot can primarily travel by ground, allowing long mission times.

The robot may include semi-autonomous software and an associated sensor subsystem that detects when an obstacle is in the robot's path such that the flight capabilities need to be invoked. In this way, the operator drives the robot in a similar way to a ground robot with the robot preferably automatically managing rolling or flying operating modes as needed.

The ducted fan engines allow a large thrust to be created in a physically small package. Unlike other hybrid air/ground robots, the ducted fans leave most of the surface of the robot available for other uses, particularly for the mounting of payloads. The ducted fans also allow enough thrust for the mass of these payloads to be accommodated in "short hop" flights. Typical payloads could include a lightweight robotic arm, a CBRNE (Chemical, Biological, Radiological, Nuclear, and Explosive) sensor suite, or additional camera equipment and illumination sources.

The preferred operation of the robot includes its ability to semi-autonomously transition in and out of its short-term flight mode. To support semi-autonomous operation, the robot incorporates an optical sensor array. Also, for semi-autonomously controlling the robot in flight, downward-looking optical flow meter sensors are included that sense movement relative to the ground and detect the presence of obstacles underneath the robot.

To support the semi-autonomous behavior of the robot, an adequate computational infrastructure is preferred. The robot may incorporate a "Companion Computer", in this case a NVidia Jetson TK1 computer (see http://www.nvidia.com/object/jetson-tk1-embedded-dev-kit.html). The Jetson computer incorporates 192 GPU (Graphical Processing Unit) cores which allow it to perform intensive graphical processing tasks. Image processing software that takes images from the sensor array in real time and detects the presence of obstacles runs on the Companion. Semi-autonomous algorithms related to transitions into and out of flight also reside on the Jetson computer.

Real-time control may be performed on two "Pixhawk" controllers that interact with the Companion computer. Each Pixhawk may contain a suite of three-axis accelerometers, gyroscopes, and magnetometers that enable the robot to maintain its position and orientation, both during ground operations and during flight. One of the Pixhawk controllers commands two motor controllers that drive the motors that power the robot during ground operations. The other Pixhawk commands four motor controllers that drive the four ducted fans that control the robot during flight operations.

Since the robot is intended to be used indoors, RF communications may be used that can penetrate typical building structures. For short distance, 802.11(b/g/n/ac) WiFi is a low cost, high data rate communications method. However, for large buildings or longer stand-off distances, an alternate means of communication may be required.

For long range communications, the robot may also incorporates TCP/IP communications via LTE cellular. The relative low frequencies used by LTE cellular can propagate through an indoor environment, allowing the robot to be controlled in scenarios where the typical outdoor, line-of-sight communications used by typical robots and drones would not be successful.

An LTE cellular modem that can utilize "FirstNet" frequencies may also be included. FirstNet is a dedicated range of frequencies devoted to First Responder use. Employing FirstNet will allow the robot to utilize a dedicated network with very high bandwidth, especially in emergency situations where the regular commercial cellular network can become overloaded.

Private, mobile cellular networks may also be deployed to provide cellular service to the robot in situations where public cellular infrastructure is not available. Such situations would include emergency situations where public cellular infrastructure is temporarily unavailable or rural locations with no/inadequate cellular coverage.

The robot may incorporate multiple ducted fans to provide a limited-duration flight capability. The use of ducted fans utilizes only a small fraction of the robot's surface, allowing the rest of the space to be used for the mounting of sensors or payloads. The use of ducted fans allows high thrust to be created so that significant payload mass can be accommodated. Potential payloads include: a robotic arm; a CBRNE sensor suite; and/or additional cameras and/or illumination (e.g. thermal imaging or high resolution cameras).

The robot may incorporate visual sensors and image processing software that allows semi-autonomous transition into and out of flight mode as needed to traverse obstacles. Control of the robot is via TCP/IP protocol over 802.11 WiFi for short-range, high data rate communications. Control of the robot may also be via TCP/IP protocol over a LTE Cellular radio. LTE Cellular communications permits long range control in an indoor environment. Use of LTE Cellular communications on FirstNet (dedicated First Responder) frequencies provide communication the widest possible bandwidth at frequencies that are amenable to indoor use. Use of a private mobile LTE Cellular network to allow control of the robot in situations with poor infrastructure, e.g. in rural locations.

The robot may incorporate a speaker, a microphone, and communications software that can allow the robot to be used as a two-way audio communications device.

Low latency streaming HD video from front and rear cameras mounted on the robot via TCP/IP communications may also be provided.

Figure 2:
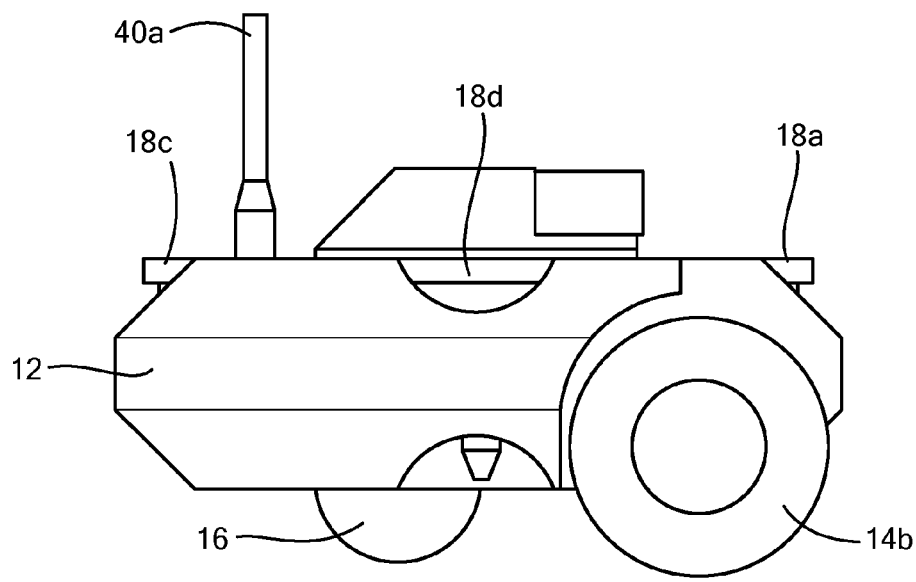
FIG. 2 is a side view of the robot of FIG. 1.
Figure 3:
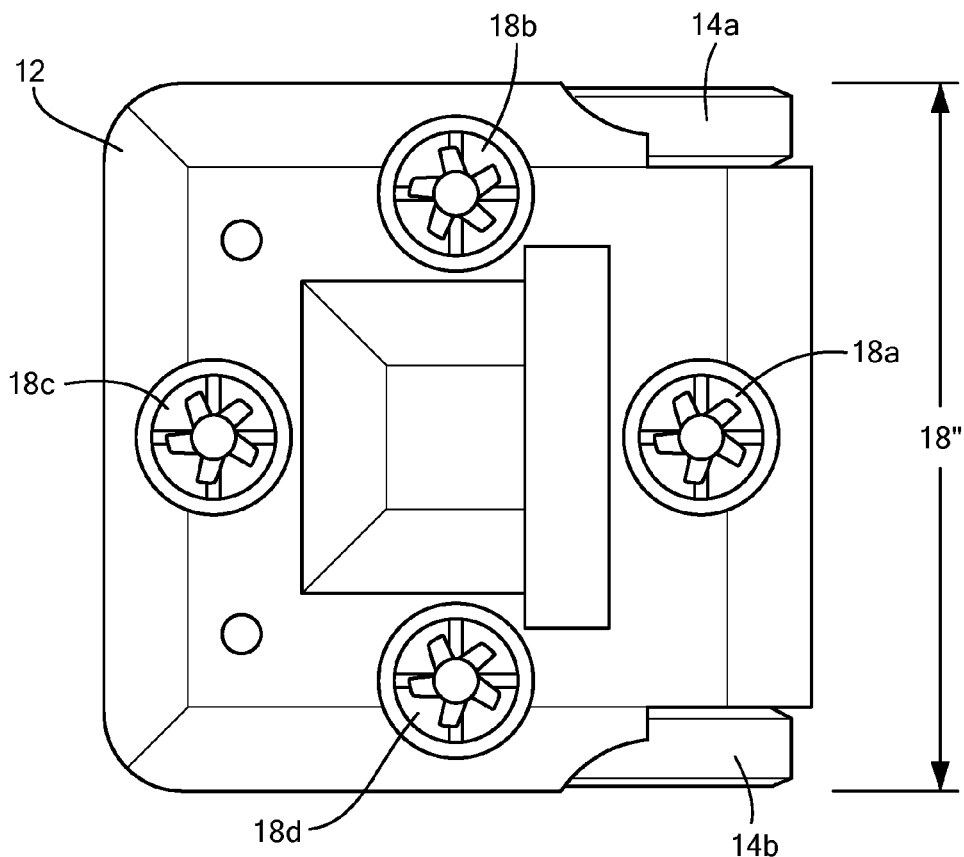
FIG. 3 is a bottom view of the robot of FIG. 1.

Shown in FIGS. 1-3 is a remotely controlled robot 10 with a robot body 12. A drive subsystem is proved for ground travel of robot body 12. The drive subsystem may include motor driven wheels 14a and 14b. A non-motorized castering wheel 16 may also be provided. Four driven wheels, tracks, legs, or other ground traveling subsystems may be used.

Figure 4:
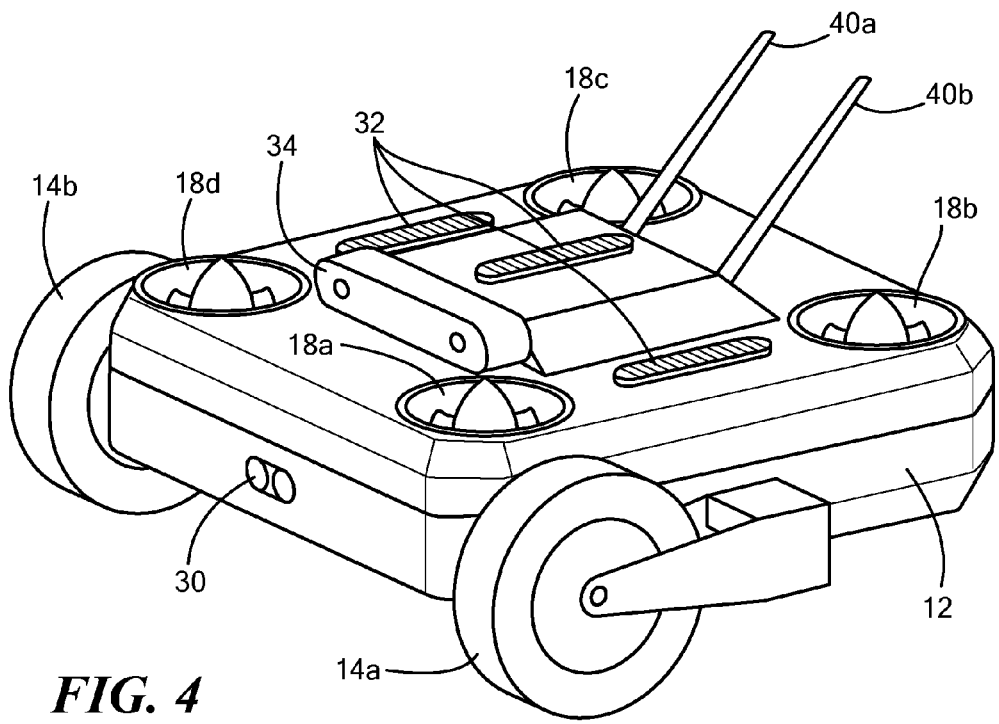
FIG. 4 is a schematic view of another example of a robot in accordance with the invention.
Figure 5:
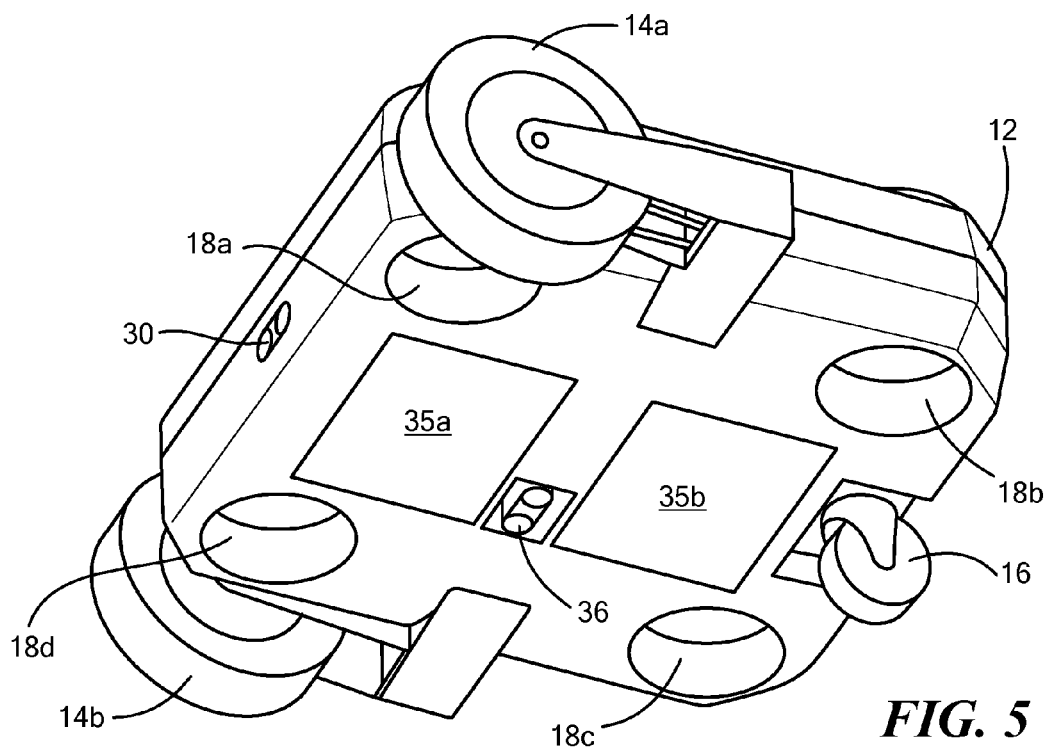
FIG. 5 is a schematic view of the bottom on the robot of FIG. 4.
Figure 6:
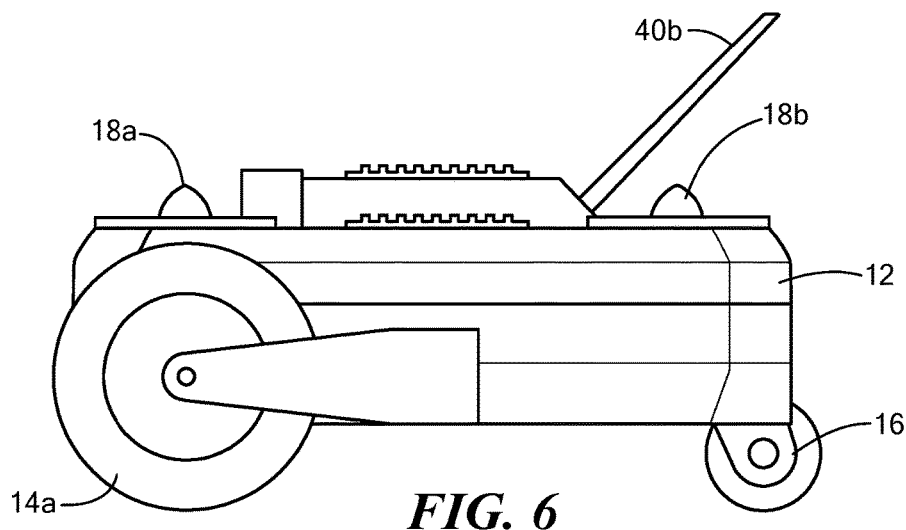
FIG. 6 is a schematic side view of the robot of FIGS. 4-5.
Figure 7:
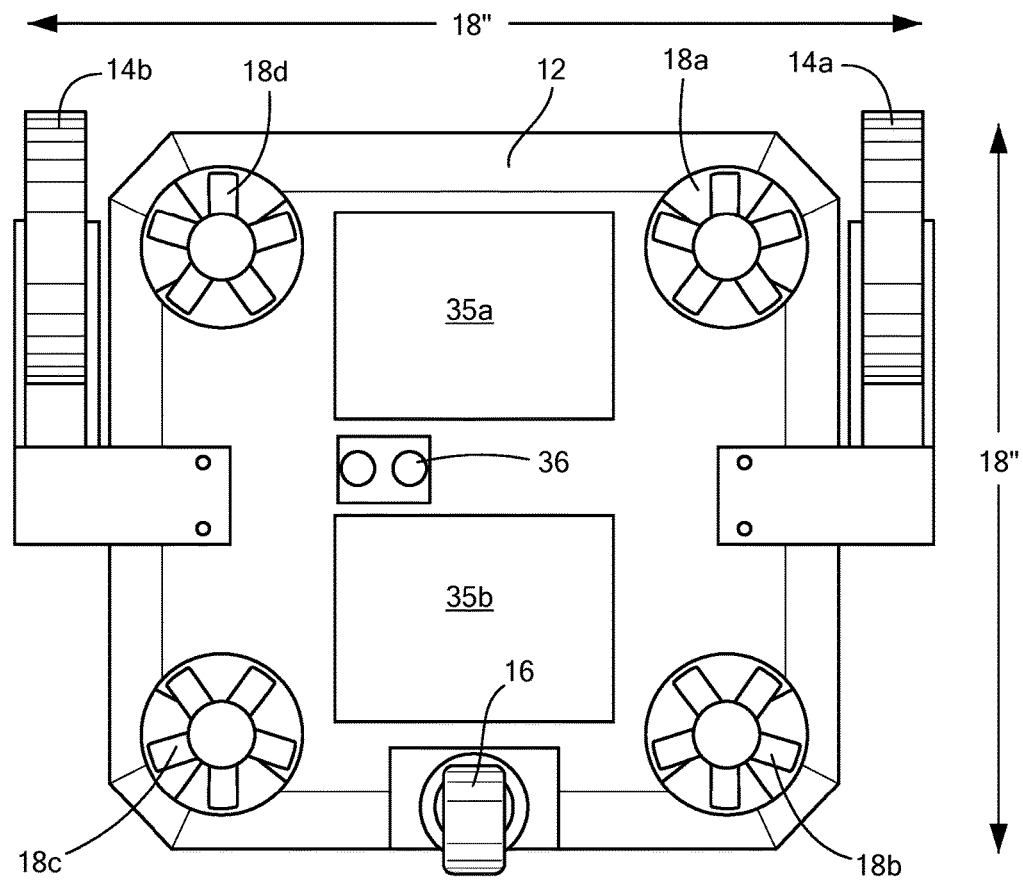
FIG. 7 is a schematic bottom view of the robot of FIGS. 4-6.
Figure 8:
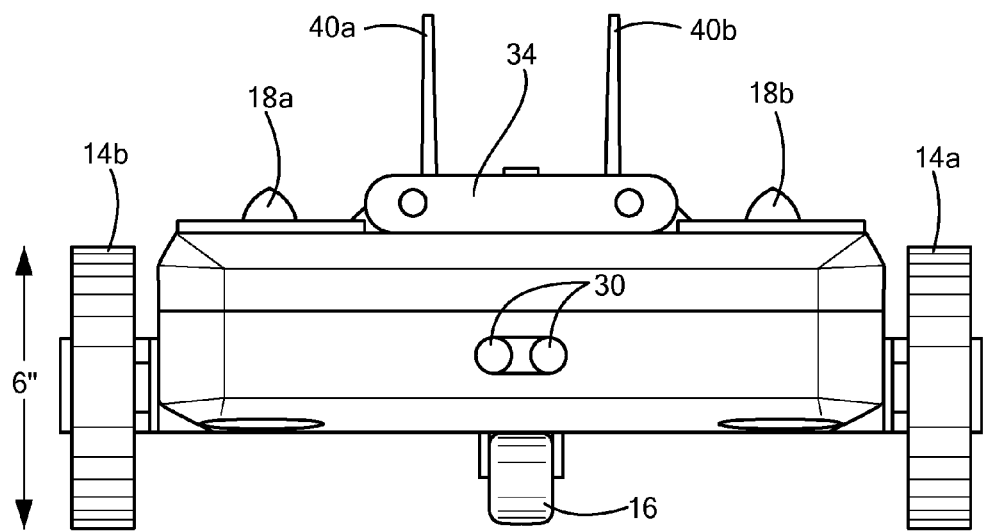
FIG. 8 is a schematic view of the front of the robot of FIGS. 4-8.
Figure 9:
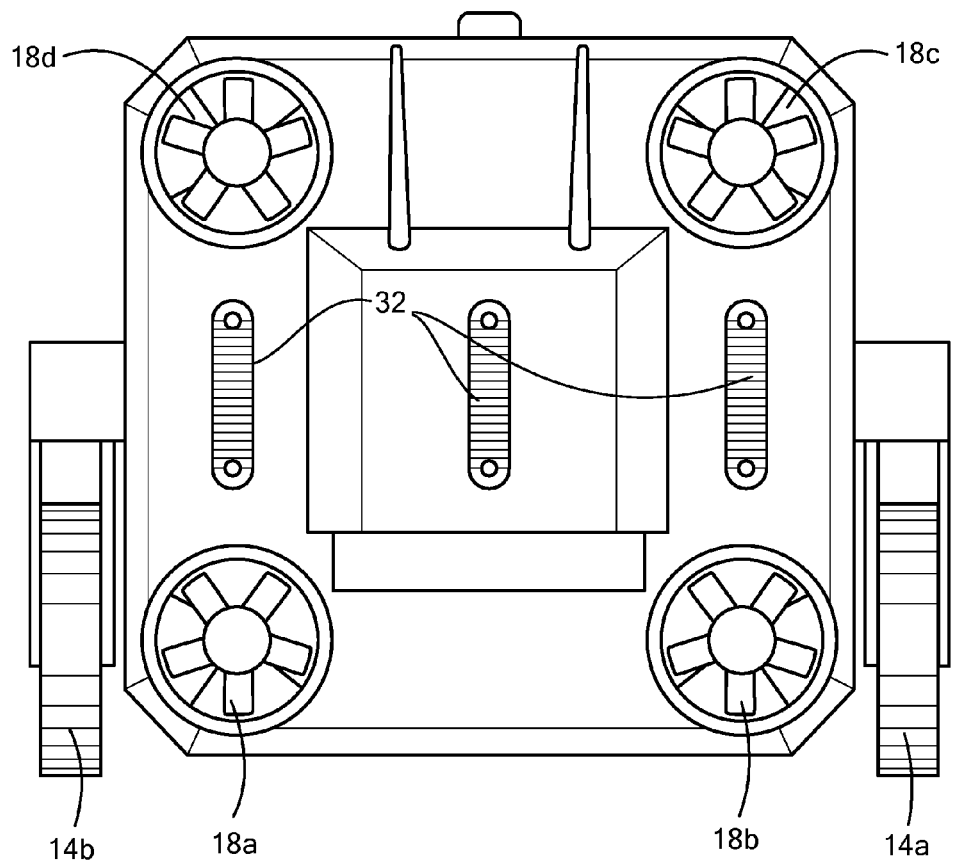
FIG. 9 is a schematic top view of the robot of FIGS. 4-8.

Robot 10 also includes a flight subsystem for flight operations. In the example shown, four fixed in place ducted fans 18a, 18b, 18c, and 18d are used and are housed in robot body 12. In this way, the top surface of robot body 12 can incorporate a payload such as a robot arm or the like. The ducted fans enable short time flight capability to traverse obstacles. Controllable gas jets using compressed gas or gas that is chemically generated could instead be used for the flight subsystem or a combination of flight capability devices could be used. Flight is enabled through devices with relatively small sizes that leave room for payloads and those same flight enabling devices have weights and "fuel" (fuel being battery energy storage or chemical energy storage etc) that is light weight (high energy density) and compatible with the overall robot system requirements described. Small controllable jets or any other method might be used in addition or instead of the ducted fans. Housing 12 is preferably a light-weight foam and carbon fiber enclosure. Removable belt driven wheel assemblies may be used for easy repairs. Cellular 40a and Wi-Fi 40b antennas are also shown mounted to the robot housing 12. Mounts such as Picatinny rails 32, FIGS. 4-5 may be located on the top surface of robot body 12 for modular payload mounting. Other payloads include sensor array 34 including one or more cameras, infrared cameras, and/or LIDAR to provide situational awareness. Other possible payloads include a chemical, biological, radiological, nuclear, and explosive sensor suite or additional camera equipment and illumination sources. A robot arm may include such cameras and illuminators or such equipment can be located on a mast. Payloads of 1-2 kilograms may be incorporated onto the robot body. FIG. 5 shows compartments 35a and 35b for batteries allowing easy hot swapping. An optical flow sensor or meter 36 downward looking from the bottom of robot body 12 allows autonomous loitering in the flight mode.

As shown in FIGS. 6-9, the robot is preferably no larger than about 18 inches wide, about 18 long, and about 6 inches tall. The robot also preferably weighs less than 25 pounds rendering the modular remotely controlled robot of the invention suitable for carrying and deployment from a backpack such as a Molle assault pack.

Figure 10:
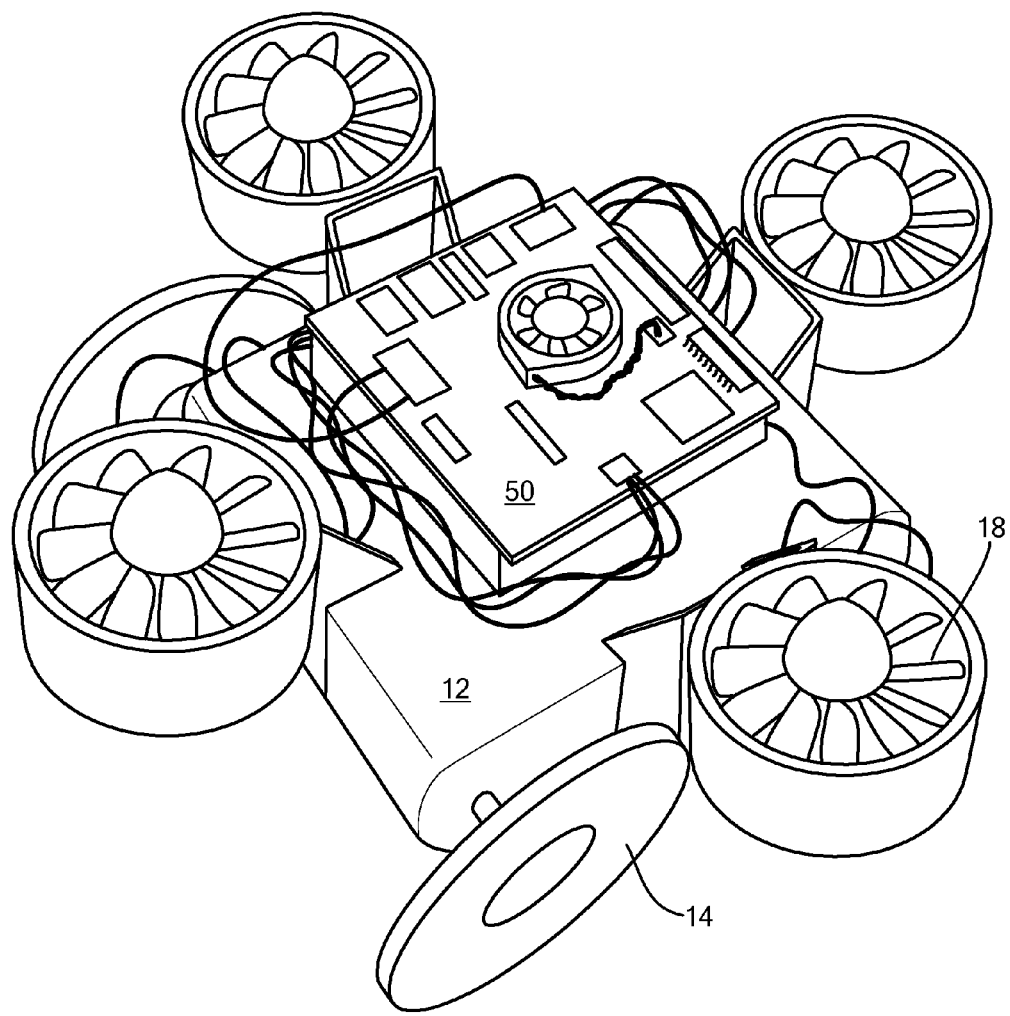
FIG. 10 is a schematic view of a proof of concept demonstration robot.
Figure 11A:
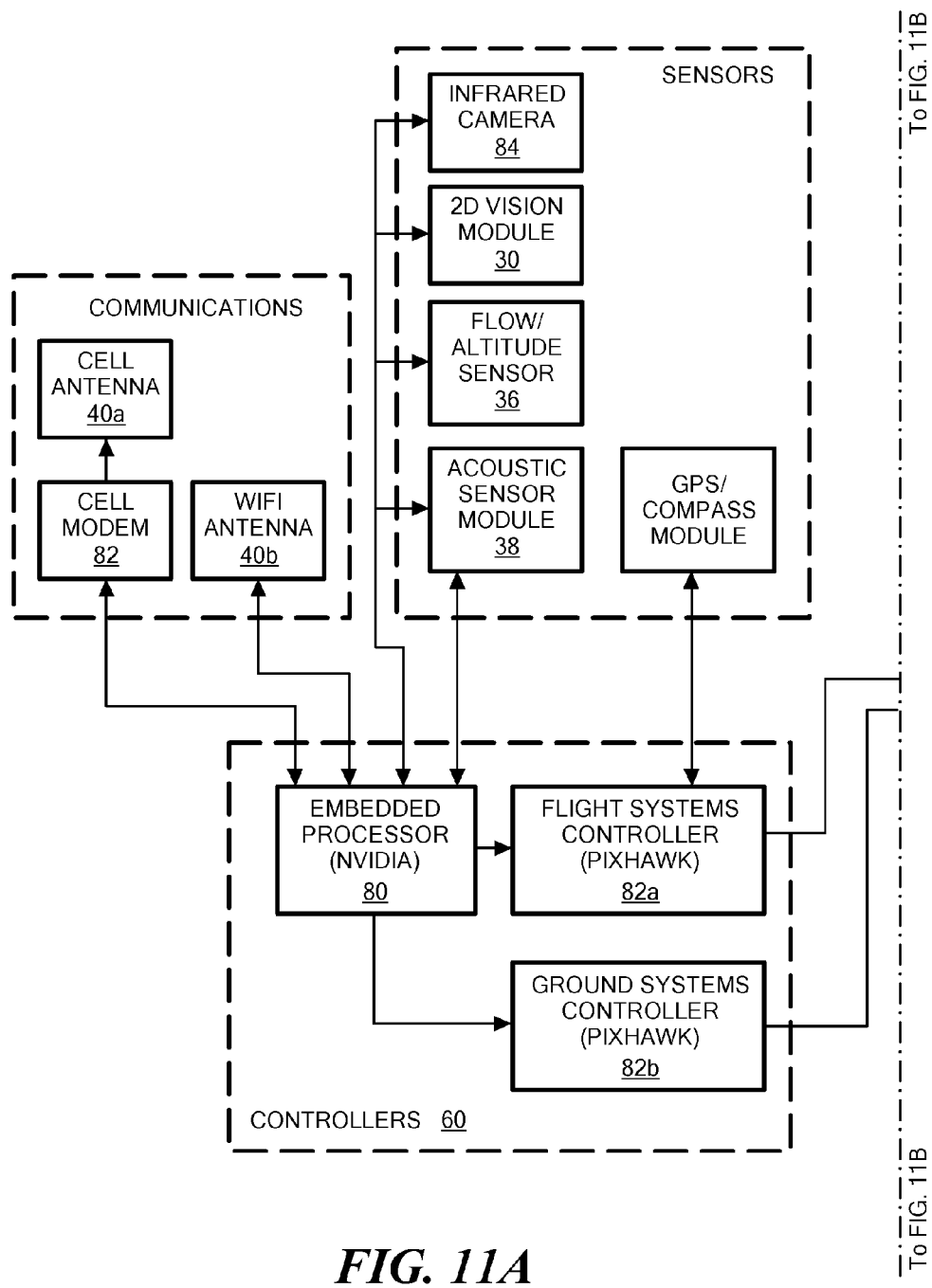
FIGS. 11A-11B are a block diagram showing the primary components associated with a mobile remotely controlled robot in accordance with the invention in one example.
Figure 11B:
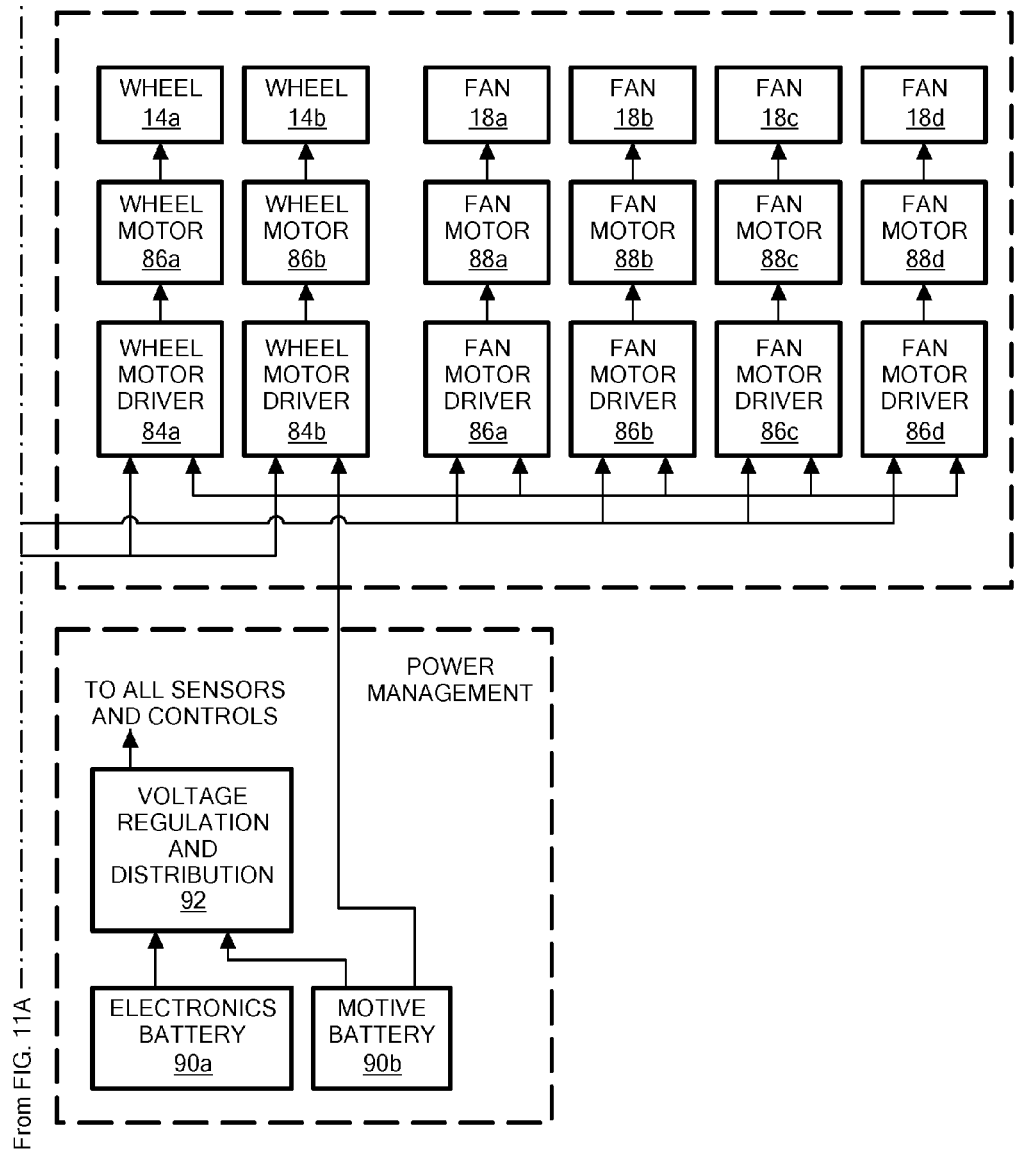

FIG. 10 shows a proof of concept demonstration robot. Housed in the robot body (not shown) is a printed circuit board 50 including the electronics subsystem which, as shown in FIG. 11 may include a controller subsystem 60. The controller subsystem is responsive to the obstacle detection subsystem and is configured to (e.g., programmed with computer instructions which) energize the flight subsystem to traverse an obstacle upon detection of the obstacle, steps 70 and 72, FIG. 12. In the absence of a detected obstacle, for example, after the obstacle has been traversed, step 74, the robot drive subsystem for ground travel is energized to save battery power and to increase the mission time. The controller subsystem may include one or more processors, microcontrollers, applications specific integrated circuits, programmable computers, or the like running on software such as computer instructions stored in memory. In the example of FIG. 11, the embedded processor 80 receives from an operator control unit transmitted commands received at cell antenna 40a and cell modem 82 and/or via Wi-Fi antenna 40b. Processor 80 is also responsive to and receives signals from vision module 30, infrared camera 84, flow altitude sensor 36, and/or acoustic sensor module 38. Embedded processor 80 preferably incorporates graphical processing unit cores which allow it to perform intensive graphical processing tasks. Image processing software that image from the sensor array in real time detects the presence of obstacles. Semi-autonomous algorithms relating to the transitions into and out of flight also reside on processor 80.

Real time control is performed by two controllers 82a and 82b that interact with and are under the control of processor 80. Each controller 82a, 82b may contain a suite of three axis accelerometers, gyroscopes, and magnetometers enabling the robot to maintain its position and orientation both during ground control operations (ground systems controller 82b) and flight operations (flight system controllers 82a). Ground system controller 82b controls the wheel motor drivers 84a, 84b controlling the RPM of wheel motors 86a, 86b for wheels 14a and 14b, respectively. Flight system controller 82a provides signals to the fan motor drivers 86a, 86b, 86c, and 86d which controls the RPM of fan motors 88a, 88b, 88c, and 88d for ducted fans 18, 18b, 18c, and 18d, respectively. Power is provided via one or more batteries 90a, 90b housed in battery compartments 35a, 35b, FIG. 5. Printed circuit board 50, FIG. 10 also includes voltage regulation and distribution circuitry 92, FIG. 11.

Figure 12:
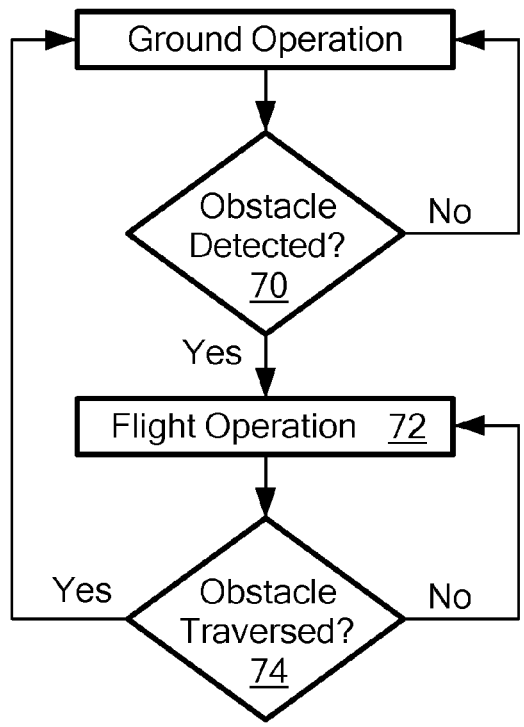
FIG. 12 is a flow chart depicting the primary steps associated with a method in accordance with an example of the invention and also describing the primary aspects of the software operating on the controller subsystem shown in FIG. 11.
Figure 13:
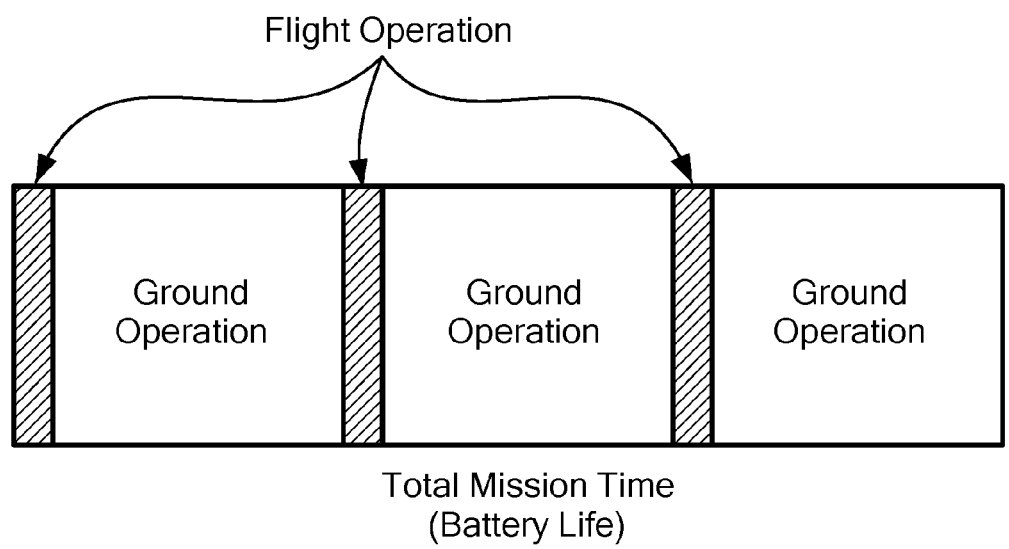
FIG. 13 is a graph showing during a typical mission the percentage of time spent in ground operations versus the percentage of time spend in flight operations.

As shown in FIG. 12, during a typical mission, the majority of the mission is spent on the ground with the ground drive subsystem energized. Flight operations are only used to traverse obstacles which may be positive (e.g., stairs, rubble, fences, and the like) or negative (e.g., culverts, holes, trenches, and the like). The robot can also fly to view items located on a table or other surface and/or to view the contents of a box. As such, raised items and surfaces are also considered obstacles. An obstacle is thus anything that robot cannot traverse while in the ground mode or anything the robot imaging subsystem cannot image while on the ground.

In this way, high power flight operations are limited, preferably, in a given mission, such that the total duration of flight operations are an order of magnitude less than the total duration of ground operations saving battery power. In some examples, upon detection of an obstacle, the flight subsystem is automatically energized by the controller subsystem. In the absence of a detected obstacle by the imaging subsystem, the controller subsystem may lock out flight operations. Still, the controller subsystem may allow an operator, via a signal sent from the operator control unit to the robot, to override the flight operation lock out. In one example, in the absence of a detected obstacle, if the operator sends a signal indicating flight operations are desired, the controller subsystem may respond with a message such as: "obstacle not detected: are flight operations to be initiated?" The operator can then choose to confirm that flight operations are indeed intended. Other methods can be used to confirm flight operations are requested and to override the flight operation lockout.

The result is a remotely controlled robot which is relatively light-weight and portable and easy to set up when personnel arrive to begin a mission for the robot. The robot easily and quickly traverses obstacles like stairs in the flight mode and yet can still carry a significant sensor payload and/or other payloads and is able to persist during a mission for a long time (e.g., several hours) on battery power.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A method comprising:
    equipping a remotely controlled robot with a drive subsystem for ground travel, a flight subsystem for flight operations, and an obstacle detection subsystem;
    configuring the robot so that during a mission, the drive subsystem is energized to maneuver the robot on the ground for a majority of the mission time;
    configuring the robot so that upon detection of an obstacle, the flight subsystem is energized to traverse the obstacle; and
    configuring the robot so that the flight subsystem is energized only to traverse obstacles saving energy and increasing the mission time.

2. The method of claim 1 in which upon detection of an obstacle, the flight subsystem is automatically energized.

3. The method of claim 2 further including locking out flight operations if no obstacle is detected.

4. The method of claim 3 further including allowing an operator to override said lockout.

5. The method of claim 1 in which the flight subsystem includes ducted fans housed in a robot body.

6. The method of claim 1 in which the drive subsystem includes one or more motorized wheels.

7. The method of claim 6 including right and left motorized wheels and a non-motorized castering wheel.

8. The method of claim 1 further including a payload associated with the robot.

9. The method of claim 8 further including mounts on the robot body for said payload.

10. The method of claim 1 in which the obstacle detection subsystem includes a forward looking camera mounted to the robot body.

11. The method of claim 10 in which the camera is a stereo camera.

12. The method of claim 10 further including an infrared camera and/or a LIDAR subsystem.

13. The method of claim 10 further including a downward looking optical flow meter mounted underneath the robot body.

14. The method of claim 1 in which the robot body is configured to fit in a Molle assault pack.

15. The method of claim 14 in which the robot body is less than about 20 inches wide by about 20 inches long and less than about 6 inches tall.

16. The method of claim 1 in which the robot weighs less than about 25 pounds.

17. The method of claim 1 further including a communications subsystem for remotely controlling the robot.

18. The method of claim 17 in which the communications subsystem includes a Wi-Fi subsystem and a cellular subsystem.

19. The method of claim 18 further including a cell antenna and a Wi-Fi antenna upstanding the robot body.

20. A remotely controlled robot comprising;
    robot body;
    a drive subsystem for ground travel of the robot body;
    a flight subsystem for flight operations of the robot body;
    an obstacle detection subsystem;
    a subsystem for powering the drive subsystem and the flight subsystem; and
    a controller subsystem responsive to the obstacle detection subsystem and configured to:
        upon detection of an obstacle, energize the flight subsystem to traverse the obstacle, and
        in the absence of a detected obstacle, energize the drive subsystem for ground travel of the robot body to save energy and to increase mission time.

21. The remotely controlled robot of claim 20 in which the drive subsystem includes one or more motorized wheels.

22. The remotely controlled robot of claim 21 including right and left motorized wheels and a non-motorized cantering wheel.

23. The remotely controlled robot of claim 20 further including a payload associated with the robot body.

24. The remotely controlled robot of claim 23 further including mounts on the robot body for said payload.

25. The remotely controlled robot of claim 20 in which the obstacle detection subsystem includes a forward looking camera mounted to the robot body.

26. The remotely controlled robot of claim 25 in which the camera is a stereo camera.

27. The remotely controlled robot of claim 25 further including an infrared camera and/or a LIDAR subsystem.

28. The remotely controlled robot of claim 25 further including a downward looking optical flow meter mounted underneath the robot body.

29. The remotely controlled robot of claim 20 in which the robot body is configured to fit in a Molle assault pack.

30. The remotely controlled robot of claim 29 in which the robot body is less than about 20 inches wide by about 20 inches long and less than about 6 inches tall.

31. The remotely controlled robot of claim 20 in which the robot weighs less than about 25 pounds.

32. The remotely controlled robot of claim 20 further including a communications subsystem for remotely controlling the robot.

33. The remotely controlled robot of claim 32 in which the communications subsystem includes a Wi-Fi subsystem and a cellular subsystem.

34. The remotely controlled robot of claim 33 further including a cell antenna and a Wi-Fi antenna upstanding the robot body.

35. The remotely controlled robot of claim 20 in which the flight subsystem includes a plurality of ducted fans housed in the robot body.

36. A method comprising:

equipping a battery powered remotely controlled robot with a drive subsystem for ground travel, a flight subsystem for flight operations, and an obstacle detection subsystem;

energizing the drive system during a mission to maneuver the robot on the ground for a majority of the mission time;

upon detection of an obstacle, the energizing flight subsystem to traverse the obstacle; and energizing the flight subsystems only to traverse obstacles saving battery power and increasing the mission time.

\* \* \* \* \*